(12) United States Patent
Reyinger et al.

(10) Patent No.: US 8,343,344 B2
(45) Date of Patent: Jan. 1, 2013

(54) FUEL FILTER HAVING WATER DISCHARGE PIPE

(75) Inventors: Jochen Reyinger, Waiblingen (DE);
Martin Weindorf, Kornwestheim (DE);
Sven Brall, Saarbruecken (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/180,857

(22) Filed: Jul. 12, 2011

(65) Prior Publication Data
US 2011/0266205 A1    Nov. 3, 2011

Related U.S. Application Data

(63) Continuation of application No. PCT/EP2009/067822, filed on Dec. 23, 2009.

(51) Int. Cl.
*B01D 35/16*    (2006.01)
*B01D 36/00*    (2006.01)
*F02M 37/22*    (2006.01)

(52) U.S. Cl. .......... 210/232; 210/86; 210/112; 210/248; 210/312

(58) Field of Classification Search ............ 210/86, 210/112, 232, 248, 312
See application file for complete search history.

(56) References Cited

U.S. PATENT DOCUMENTS

| 4,512,884 | A  | * | 4/1985  | Wheatley ............... 210/136 |
| 5,462,658 | A  | * | 10/1995 | Sem ..................... 210/172.1 |
| 5,788,859 | A  | * | 8/1998  | Biere .................... 210/312 |
| 7,731,845 | B2 | * | 6/2010  | Lampert et al. ......... 210/232 |
| 2008/0272046 | A1 | * | 11/2008 | Lampert et al. ....... 210/312 |

* cited by examiner

*Primary Examiner* — Thomas M Lithgow
(74) *Attorney, Agent, or Firm* — James Hasselbeck

(57) ABSTRACT

The invention relates to a fuel filter (1), in particular for internal combustion engines of vehicles, comprising: a filter housing (2) having a cover (4) and a housing pot (3), a filter element (5) arranged in said housing pot (3) having a water collection space (9) formed in a floor region (10) between said filter element (5) and said housing pot (3) and a guide pipe (11) exiting from said water collection space (9) wherein a water discharge pipe (16) is arranged through which the water contained in said water collection space (9) can be borne out to the top side of said filter housing (2), wherein said guide pipe (11) protrudes over said cover (4) of said filter housing (2).

12 Claims, 2 Drawing Sheets

FUEL FILTER HAVING WATER DISCHARGE PIPE

CROSS REFERENCE TO RELATED APPLICATIONS

This application is a continuation application of PCT International Application No. PCT/EP2009/067822 having an international filing date of Dec. 23, 2009 and designating the United States, the present application through the International Application claiming a priority date of Jan. 12, 2009 based on prior filed German patent application No. 20 2009 000 429.5, the entire contents of the aforesaid PCT International Application being incorporated herein by reference.

TECHNICAL FIELD

The invention concerns a fuel filter having a filter housing with a cover and a housing pot, a filter element arranged in the housing pot, a water collecting chamber formed in a bottom area between the filter element and the housing pot as well as a guide pipe extending away from the water collecting chamber in which a water discharge pipe is arranged through which the water contained in the water collecting chamber can be discharged to the topside of the filter housing.

BACKGROUND OF THE INVENTION

DE 10 2006 051 406 A1 of the applicant discloses a fuel filter as described above in which the cover is embodied as a housing head that is screwed onto the housing pot. The guide pipe ends in the housing head at a sealing plug that separates the interior of the guide pipe from the surrounding clean area. In case the sealing plug does not completely seal the clean area, it is possible that unpurified water/fuel mixture can pass from the guide pipe into the surrounding clean area.

SUMMARY OF THE INVENTION

It is an object of the invention to provide a fuel filter in which water discharge can be realized at the topside of the filter housing and no water can reach the clean area of the fuel filter.

This object is solved by a fuel filter of the aforementioned kind in which the guide pipe projects past the cover of the filter housing. In this way, the water that is guided in the water discharge pipe can be guided in the guide pipe out of the filter housing without coming into contact with the clean area of the fuel filter.

In an advantageous embodiment the cover has an outlet opening for the purified fuel and the guide pipe extends in axial direction through the outlet opening. The generally annular outlet opening enables transporting away the purified fuel. The water discharge can be realized in this connection by means of the discharge pipe at a spacing relative to the outlet opening.

The fuel filter comprises preferably a thread in the area of the cover for connecting the filter housing with the filter head. The filter housing with the guide pipe is embodied as an interchangeable filter. The thread can be formed on the guide pipe in the area projecting past the cover or the filter housing itself can have a thread on its cover; in particular, it is also possible that the outlet opening is provided with a thread.

In an advantageous embodiment, the guide pipe in the area projecting past the cover has on its outer wall at least one discharge opening for discharging the water. The water discharge out of the water discharge pipe can be realized in this case through the wall surface of the guide pipe.

Between the guide pipe and the filter element preferably a seal for sealing the water collecting chamber is provided. By means of the seal the water collecting chamber can be sealed relative to a clean side that is located above the water collecting chamber.

In an advantageous embodiment the fuel filter is provided with a water sensor. The water sensor is arranged in the bottom area of the filter pot and serves for recognizing the water quantity in the water connecting chamber; its electrical connecting lines can extend through the guide pipe. When the water sensor is connected to a control device that is connected to a valve or a water pump, the water discharge from the water collecting chamber can be realized in a controlled fashion.

In a preferred embodiment, the fuel filter comprises a filter head that is connectable at the cover with the filter housing. The filter housing with the guide pipe can be screw-connected in particular with the filter head.

Preferably, the filter head has an axial tubular receptacle for the guide pipe. The guide pipe upon connection of the filter head with the filter housing is pushed into the receptacle and is guided by it. In order to discharge the water exiting from the discharge opening, on the wall surface of the receptacle at the level of the discharge opening a pipe can be provided that extends transversely to the receptacle.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
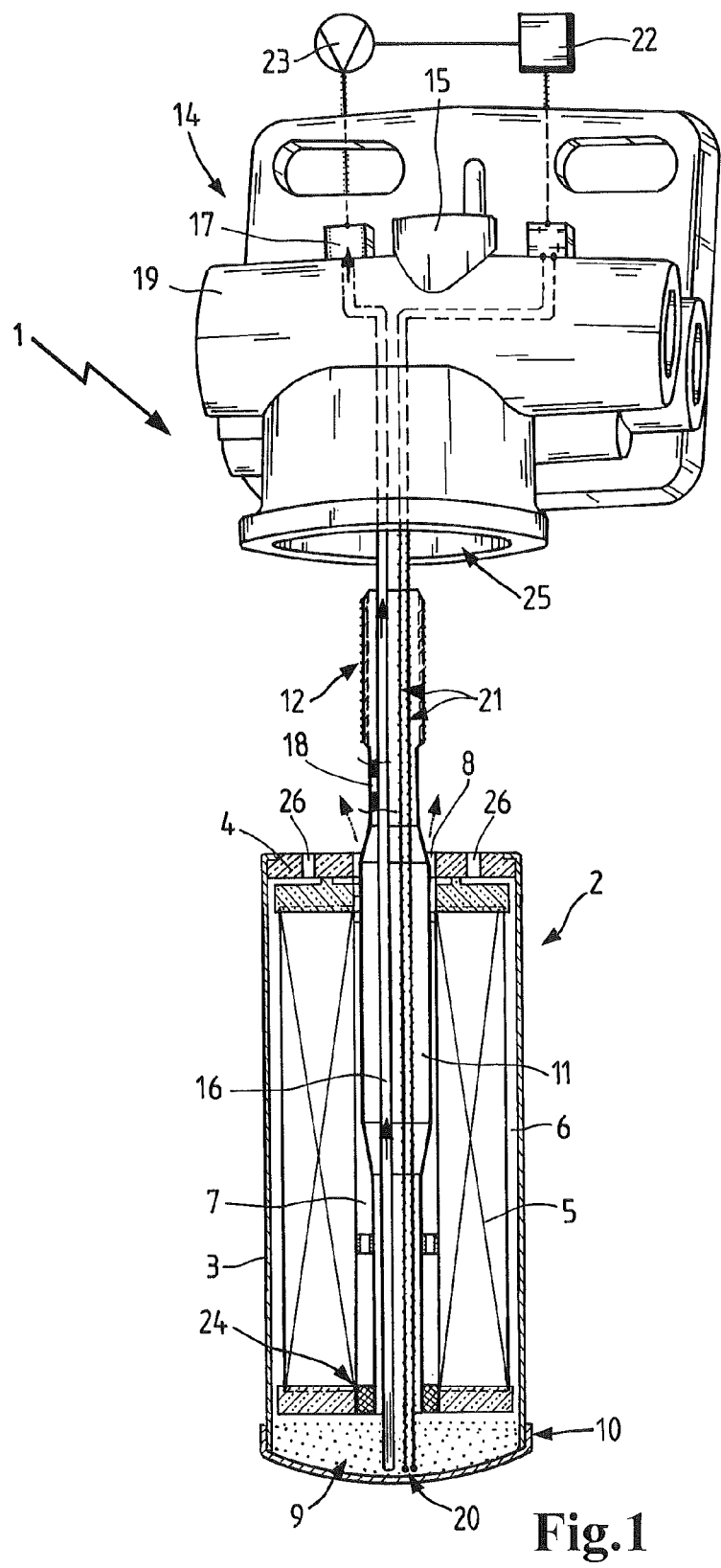
FIG. 1 shows the exploded view of a fuel filter that is mounted on a filter head. The connection of the fuel filter with the filter head is schematically illustrated.
Figure 2:
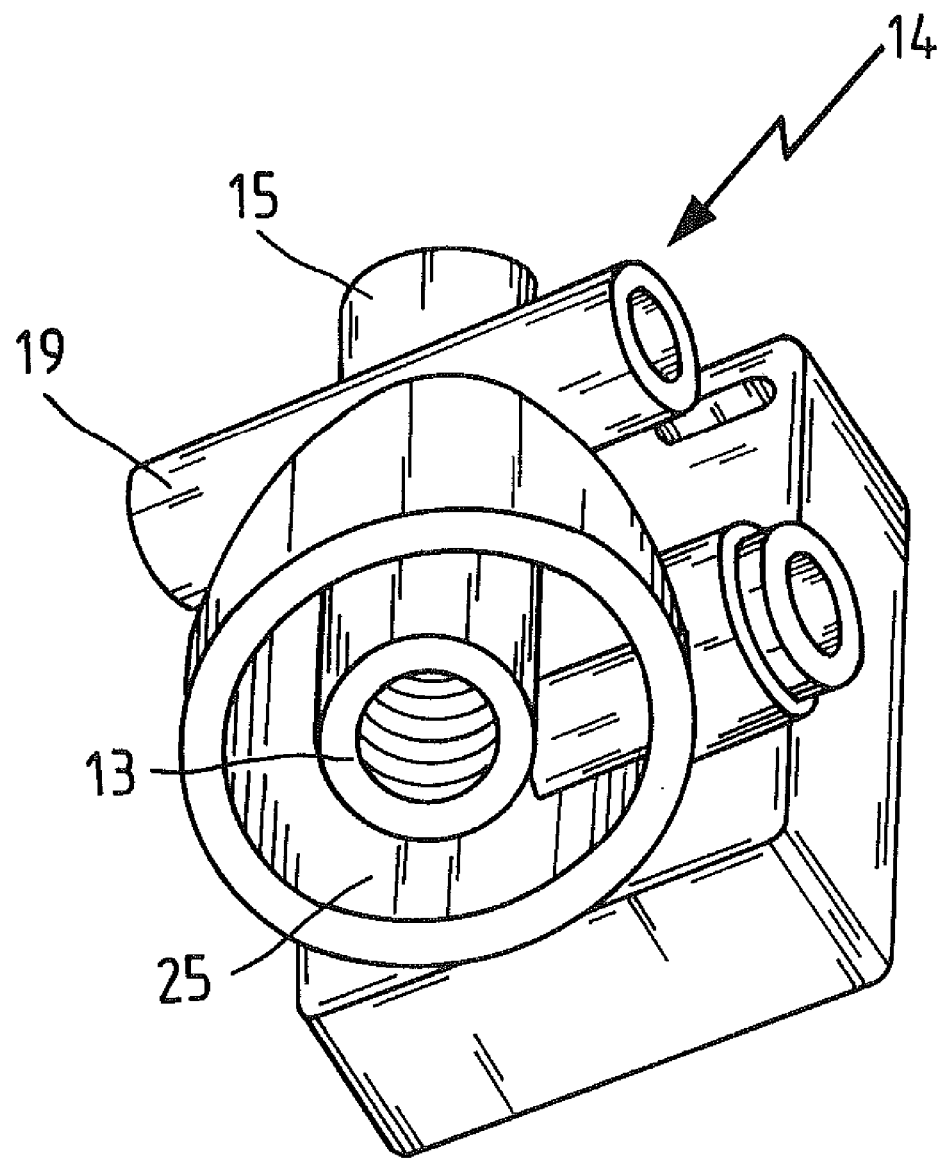
FIG. 2 shows in another perspective view the filter head that is suitable for receiving the fuel filter.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a fuel filter. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The fuel filter 1 comprises a filter housing 2 with a housing pot 3 and a cover 4. In the housing pot 3 a filter element 5 of a hollow-cylindrical configuration is arranged which separates a raw side 6 of the fuel filter 1 formed between the housing pot 3 and the filter element 5 from a clean side 7 that is positioned in radial direction inwardly. The cover 4 has a centrally arranged outlet opening 8 that corresponds with the clean side 7. Moreover, the cover 4 comprises several inlet openings 26 arranged in distribution through which the fuel that is to be purified can flow at the raw side 6 into the filter housing 2.

When purifying the fuel, water that is contained in the fuel is prevented by the filter element 5 from passing from the raw side 6 to the clean side 7. Since the water has a higher density than the fuel, the water sinks into the water collecting chamber 9 at the bottom area 10 of the housing pot 3. A guide pipe 11 extends away from the water collecting chamber 9 and projects past the cover 4 of the filter housing 2. The guide pipe 11 has moreover a thread 12 with which the filter housing 2 can be screwed onto a flange 13 of a filter head 14. The guide pipe 11 is received in this connection in an axially extending pipe 15 of the filter head 14.

In the guide pipe 11 a water discharge pipe 16 extends axially which connects the water collecting chamber 9 with a water outlet 17 of the filter head 14. In order to enable transport of the water toward the water outlet 17, in the guide pipe 11, in the area projecting past the cover 4, a discharge opening 18 is provided that, in the screwed-on state of the fuel filter 1, is located at the level of a further pipe 19 of the filter head 14 that extends at a right angle to the axially extending pipe 15 and is connected thereto.

In the water collecting chamber 9 there is moreover a water sensor 20 for determining the filling level of the water. The water sensor 20 has electrical connecting lines 21 that also extend axially within the guide pipe 11 and are connected through the filter head 14 to a control device 22. The control device 22 serves for controlling a water pump 23 that is connected to the outlet 17 in order to effect a controlled water discharge from the water collecting chamber 9.

In order to seal the water collecting chamber 9 relative to the clean side 7, between the tubular cylindrical filter element 5 and the guide pipe 11 a seal 24 in the form of an O-ring is mounted. The discharge of the purified fuel through the outlet opening 8 on the clean side 7 is realized also through the filter head 14, namely through an annular space 25 surrounding the pipe 15 extending in axial direction. The water discharge and the discharge of the purified fuel are thus realized at two separate locations so that no water can pass into the clean area of the fuel filter 1. It is understood that alternatively to the above described discharge of the water at the outer wall of the guide pipe 11 the discharge can also be realized at the upper end of the water discharge pipe 16.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A fuel filter for an internal combustion engine, comprising:
   a filter housing including
      a housing pot having an axially extending sidewall and closed at the bottom forming cup shaped chamber therein;
      a cover secured to an upper portion of said sidewall, said cover closing over said cup-shaped chamber;
   a filter element arranged within said cup-shaped chamber inside of said housing pot;
   a water collecting chamber formed in a bottom area between said filter element and said closed bottom of said housing pot;
   a guide pipe extending away from said water collecting chamber through said cover of said filter housing;
   wherein said guide pipe extends in an axial direction outwardly beyond said cover and a topside of said filter housing;
   a water discharge pipe arranged within said guide pipe and extending from said water collection chamber through said interior of said guide pipe to said topside of said filter element,
   wherein water contained in said water collecting chamber is discharged through said water discharge pipe through said cover and to said topside.

2. The fuel filter according to claim 1, wherein
   said cover has an outlet opening extending therethrough from said chamber in said filter housing to said topside of said filter housing,
   wherein said guide pipe extends in an axial direction axially through said outlet opening in said cover, and
   wherein purified liquid from said filter element exists said filter housing through said outlet opening.

3. The fuel filter according to claim 1, further comprising
   a thread or a bayonet closure detachable fastening means arranged in the area of said cover, said fastening means detachably fastening said filter housing onto a filter head.

4. The fuel filter according to claim 1, wherein
   said guide pipe, in the area arranged and projecting outwardly past said cover and past said filter housing, has arranged in an outer wall of said guide pipe at least one discharge opening,
   wherein said guide pipe includes a fluid passage extending axially in said guide pipe between said discharge opening and said water collecting chamber in said cup shaped chamber of said housing pot, and wherein said water collected in said water collection chamber is discharged through said discharge opening.

5. The fuel filter according to claim 1, further comprising a seal arranged between an outer wall of said guide pipe and a bottom end disk of said filter element, said seal sealing said water collection chamber from an interior of said filter element, wherein water in said water collection chamber is sealably isolated and prevented from passing along an outer wall of said guide pipe and said bottom end disk to enter said interior of said filter element.

6. The fuel filter according to claim 1, further comprising a water sensor extending from an interior passage of said guide pipe into said water collection chamber, wherein electrical connecting lines of said water sensor extend axially along an interior of said guide pipe.

7. The fuel filter according to claim 3 in which said filter head comprises an axial tubular receptacle into which said guide pipe detachably connects, said axial tubular receptacle extending axially outwardly in a direction away from said filter head and away from said filter housing on a side of said filter head opposite said filter housing.

8. The fuel filter according to claim 2, further comprising a thread or a bayonet closure detachable fastening means arranged in the area of said cover, said fastening means detachably fastening said filter housing onto a filter head.

9. The fuel filter according to claim 8, wherein said guide pipe, in the area arranged and projecting outwardly past said cover and past said filter housing, has arranged in an outer wall of said guide pipe at least one discharge opening, wherein said guide pipe includes a fluid passage extending axially in said guide pipe between said discharge opening and said water collecting chamber in said cup shaped chamber of said housing pot, and wherein said water collected in said water collection chamber is discharged through said discharge opening.

10. The fuel filter according to claim 9, further comprising a seal arranged between an outer wall of said guide pipe and a bottom end disk of said filter element, said seal sealing said water collection chamber from an interior of said filter element, wherein water in said water collection chamber is sealably isolated and prevented from passing along an outer wall of said guide pipe and said bottom end disk to enter said interior of said filter element.

11. The fuel filter according to claim 10, further comprising a water sensor extending from an interior passage of said guide pipe into said water collection chamber, wherein electrical connecting lines of said water sensor extend axially along an interior of said guide pipe.

12. The fuel filter according to claim 11 in which said filter head comprises an axial tubular receptacle into which said guide pipe detachably connects, said axial tubular receptacle extending axially outwardly in a direction away from said filter head and away from said filter housing on a side of said filter head opposite said filter housing.

* * * * *